United States Patent [19]
Kogure et al.

[11] Patent Number: 5,902,946
[45] Date of Patent: May 11, 1999

[54] INSTRUMENT FOR MUSICAL THERAPY

[75] Inventors: Kyuya Kogure, Fukaya; Kenji Nagase, 17-16, Waseda 7-chome, Misato, Saitama-ken, both of Japan

[73] Assignee: Kenji Nagase, Japan

[21] Appl. No.: 08/694,109

[22] Filed: Aug. 8, 1996

[30] Foreign Application Priority Data

Aug. 9, 1995 [JP] Japan .................................. 7-222724

[51] Int. Cl.⁶ .................................................. G09B 15/02
[52] U.S. Cl. ...................................... 84/477 R; 84/470 R
[58] Field of Search .......................... 84/477 R, 470 R; 434/169, 307 R, 307 A, 308, 265, 156, 185

[56] References Cited

U.S. PATENT DOCUMENTS

| | | | |
|---|---|---|---|
| 3,562,394 | 2/1971 | Kiepe | 84/678 |
| 3,795,989 | 3/1974 | Greenberg et al. | 434/339 |
| 4,023,457 | 5/1977 | Kirkwood et al. | 84/686 |
| 4,350,070 | 9/1982 | Bahn | 84/612 |
| 4,881,443 | 11/1989 | Bertram | 84/473 |
| 5,119,932 | 6/1992 | Semanoff | 206/214 |

Primary Examiner—William M. Shoop, Jr.
Assistant Examiner—Shih-yung Hsieh
Attorney, Agent, or Firm—Adams & Wilks

[57] ABSTRACT

A musical instrument for musical therapy which stimulates and urges patients suffering from dementia, aphasia, and other functional disorders of the brain to voluntarily play and to sing a song comprises an indicating part for displaying the lyrics of a song or other musical indicia in a predetermined pattern, an operating panel, and a scale generator. The indicating part is mounted upon the operating panel, which is provided with a plurality of switch elements arranged in physical alignment with the respective lyrics of the song or other musical indicia. The plural switch elements are connected to the scale generator such that a musical tone or voice signal is output by the scale generator in accordance with a selected switch element. By use of the inventive device, a patient is stimulated and urged to sing the song when the patient successively activates the switch elements corresponding to the displayed lyrics of the song.

18 Claims, 10 Drawing Sheets

INSTRUMENT FOR MUSICAL THERAPY

BACKGROUND OF THE INVENTION

1. Field of the Invention

The present invention relates generally to a musical instrument and, more particularly, to a musical therapy instrument for assisting in the development of verbal and musical skills in children, for the rehabilitation of such skills in the elderly, and for the treatment of patients suffering from disorders such as dementia, aphasia, and other functional disorders of the brain.

2. Background Information

The beneficial effects of musical therapy in the development of verbal and musical skills in children, in the reconstruction of the speech faculty and memory of the elderly, and in the treatment of patients suffering from disorders such as dementia, aphasia, and other functional disorders of the brain, have been widely recognized. It is well known that musical therapy has significant beneficial effects in the treatment of such disorders, and this is especially so when songs familiar to and enjoyed by the patient are used during administration of the therapy.

For example, in patients suffering from dementia, musical therapy has been demonstrated to be an effective and useful therapy widely administered to assist such patients in the recovery of his or her sense of reality and to enable the patient to return to active life. In such cases, the therapy has an uplifting and positive effect on the patient, and serves to stimulate the patient's desire and ability to regain forgotten memories by use of cognitive associative functions enabled when the patient is urged to listen to or sing a song familiar to and enjoyed by him or her.

In addition, in patients suffering from aphasia caused by severe head trauma or other damage to the brain, it is well known that many patients undergoing musical therapy begin to vocalize the words of particular songs within their memories when the patients are stimulated and urged to listen to or to sing a song familiar to him or her. Accordingly, musical therapy has, in many instances, served as a highly effective therapy for reconstruction of the speech faculty in the brain of aphasiac patients.

In patients suffering from severe physical disabilities, however, the administration of musical therapy using conventional musical instruments or devices is difficult. For example, functional disorders of the brain such as dementia and aphasia are often accompanied by physical manifestations or conditions which limit or profoundly curtail the patient's ability of physical movement. As a result, it is often difficult for such patients to voluntarily sing a song, and, in many cases, it is difficult or impossible for such patients to manipulate the keys or strings of a conventional musical instrument due to the loss of manual dexterity. Small children and some elderly persons may also lack the physical and/or mental ability to play a conventional instrument.

It is also known that the beneficial effects of musical therapy are highly related to individual musical tastes and abilities. Thus, while physicians, nurses and other therapists engaged in the administration of musical therapy generally attempt to select a song for a therapy session that is well suited to a particular patient, the selection process becomes more complicated in the administration of group therapy. When a group of patients are urged to listen to a selected song and, if possible, to sing along with the melody or play the song using a musical instrument or other device specially designed to produce musical and/or vocal accompaniment, the therapy is more effective in patients to whom the song is best suited, i.e., those patients who are familiar with and enjoy the song.

Due to the lack of an adequate number of qualified therapists to accommodate the rapidly increasing number of persons in need of such treatment, musical therapy is often administered simultaneously to a group of patients. Since musical abilities and tastes vary widely among patients in different age groups and in patients having different physical and mental disabilities and life experiences, however, group therapy has not generally obtained the same level of success obtained by individual treatment.

Accordingly, there is a need for a musical therapy instrument which is capable of use by patients having severely limited physical abilities and which is effective in restoring verbal and speech faculties without the need for direct therapist supervision.

SUMMARY OF THE INVENTION

In view of the foregoing, an object of the present invention is to provide a musical instrument effective for use in the development of basic verbal and musical skills in children.

It is another object of the present invention to provide a musical instrument effective for use in restoring the speech faculty and basic mechanical abilities in elderly persons.

Another object of the present invention is to provide an instrument for the administration of musical therapy for the treatment of patients suffering from dementia, aphasia, and other functional disorders of the brain, and which enables such patients to voluntarily play a desired song and to sing the song by the induction in the patient's memory of its melody and rhythm even in the case of patients who do not have the knowledge or physical ability to play a conventional musical instrument.

It is yet another object of the present invention to provide an instrument for the administration of musical therapy which is effective without the presence of a therapist.

Still yet another object of the present invention is to provide an instrument for the administration of musical therapy which is effective regardless of the age, musical ability and musical taste of the patient.

It is expected that if such a musical therapy instrument is made available to patients for individual use at medical institutions, rehabilitation centers, or at home, the favorable results of musical therapy will be achieved to facilitate the recovery of patients suffering from dementia and other brain disorders.

Such a musical instrument will also serve as an invaluable tool to promote the development of basic verbal, musical, and mechanical abilities in small children and in the rehabilitation of such skills in elderly persons.

The above objects and others are achieved by the musical instrument of the present invention, which comprises indicating means for displaying musical indicia arranged in a predetermined pattern, an operating panel receptive of the indicating means and having a plurality of switch elements in physical alignment with the musical indicia displayed by the indicating means, and a scale generator connected to the plurality of switch elements to output a musical tone signal having a pitch corresponding to a selected switch element.

Preferably, the musical indicia comprises the lyrics of a song and the indicating means comprises a card formed of a sheet of plain or laminated paper, light stock cardboard or a plastic sheet imprinted with the lyrics of a song. A plurality of such cards are preferably made available for the treatment of patients, each card being imprinted with the lyrics of a different song arranged in a predetermined pattern. The lyrics of the song are preferably arranged on the indicating means in a manner such that when the indicating means is mounted on the operating panel, the individual lyrics of the song are physically aligned with respective ones of the switch elements such that when a switch element corresponding to a respective lyric of the song is selected, the tone generator generates a corresponding tone. Accordingly, when the patient sequentially selects the switch elements corresponding to the lyrics of the song displayed by the indicating means by use of his or her fingertip or an input device, for example, the words of the song are converted by the tone generator into a series of musical tone signals to output the melody of the selected song. Preferably, the musical indicia is arranged in a predetermined pattern to cooperate with the arrangement of switch elements of the operating panel such that a song represented by the musical indicia may be played by sequentially activating the switch elements by a swiping motion of the user's fingertip or an input device across the indicating means in the predetermined pattern.

In accordance with the foregoing structure, the musical therapy instrument of the present invention may be used by patients having little or no musical knowledge or ability, and is effective to stimulate and urge a patient to vocalize the melody and/or lyrics of a selected song displayed by the indicating means when the switch elements corresponding to the lyrics of the song are operated.

DETAILED DESCRIPTION OF THE PREFERRED EMBODIMENTS

Figure 1:
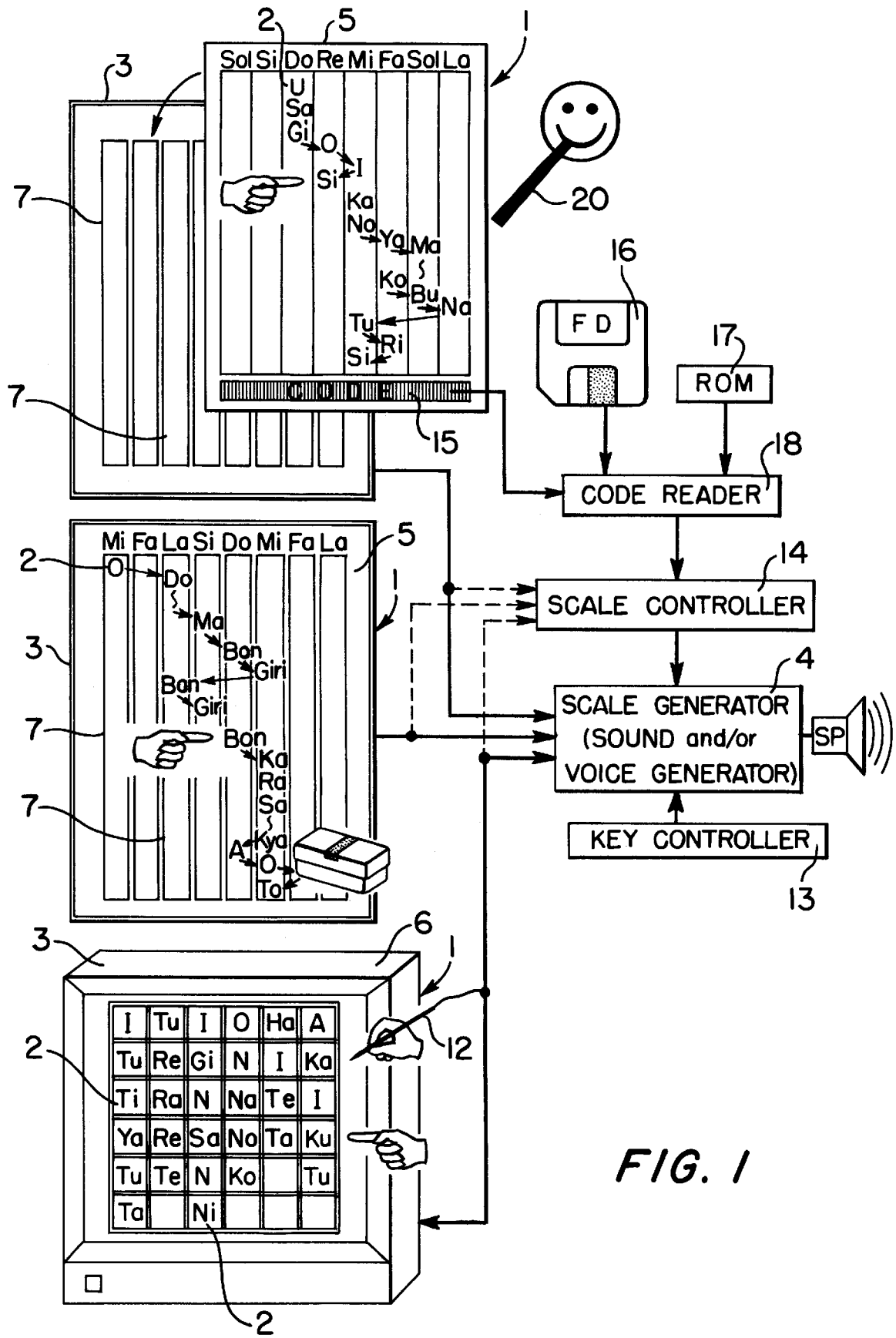
FIG. 1 is a layout diagram illustrating the basic construction of the musical instrument according to the present invention.

Various preferred embodiments of the musical instrument of the present invention will now be described in conjunction with the attached drawings, in which identical reference numerals are used to denote identical elements throughout.

FIG. 1 illustrates the basic construction of the musical instrument of the present invention. More specifically, the left-hand side of FIG. 1 is divided into three portions, i.e., an upper portion, a middle portion and a lower portion, for the purpose of illustrating the construction of three preferred types of input devices of the inventive musical instrument. As shown in FIG. 1, in each of these three basic constructions, the musical instrument comprises an indicating part 1 for displaying the lyrics of a song or other musical indicia (generally denoted by reference numeral 2), an operating panel 3 having a plurality of switch elements corresponding to the lyrics of the song or other musical indicia 2 displayed by the indicating part 1, and a scale generator 4 connected to the switch elements of the operating panel 3. A scale controller 14 is used for controlling the scale generator 4.

As further illustrated in FIG. 1, the musical therapy instrument may also include additional input means, each of which is described in greater detail below, such as a code reader 18 for reading encoded musical data stored on a floppy disk (FD) 16 or in a memory device (ROM) 17 and converting such musical data into a signal for driving the scale controller 14. As illustrated in the upper portion of FIG. 1, the indicating part 1 may be further provided with a code 15 containing encoded musical data in the form of a bar code, for example, which is representative of the lyrics, music or tempo of a song or other musical indicia 2 displayed by the indicating part 1. The code reader 18 serves to read the code 15, to distinguish or discriminate the musical indication, and to output a corresponding signal to the scale controller 14 for control of the scale generator 4.

As illustrated in the upper portion of FIG. 1, in one embodiment of the present invention the indicating part 1 is a sheet-type indicating body 5 in the nature of a plain or laminated rectangular sheet of paper, light stock cardboard, or plastic, and is imprinted with the musical indicia 2 and code 15. As illustrated in the middle portion of FIG. 1, the operating panel 3 may instead be provided with a fixedly mounted indicating body 5 having an erasable surface such that the user or therapist may manually imprint musical indicia 2 such as the lyrics of a song or a melody thereon in a predetermined pattern which later may be erased using an appropriate eraser 11. Alternatively, as illustrated in the lower portion of FIG. 1, the indicating part 1 may also be constructed using an electronic display device 6 for electrically displaying the lyrics of a song or other musical indicia 2 by use of a CRT display, a liquid crystal display device, or the like. As will be appreciated by those of ordinary skill in the art, any device or member capable of selectively displaying the lyrics of a song or other musical indicia 2 in a predetermined pattern may generally serve as the indicating part 1 as long as such device or member is capable of displaying such musical indicia in alignment with a plurality of switch elements to permit selective activation of the respective switch elements in accordance with the arrangement of the lyrics of the song or other musical indicia 2.

For example, when the indicating body 5 is in the nature of a card formed of a sheet of paper or the like, the musical indicia 2 is imprinted on the indicating body 5 by use of printing, photocopying, hand writing, or the like. Thus, a plurality of pre-printed cards may be provided each having a different song or other musical indicia imprinted thereon.

Alternatively, the indicating body 5 may be provided in the nature of a sheet of paper, cardboard, or plastic, and a particular song or other musical indicia 2 may be printed on the indicating body 5 by the user or therapist using a marker or other writing instrument. In such case, it is preferable to provide such indicating body 5 with pre-printed indica representing the outlines of the respective switch elements.

The words or other musical indicia may be arranged on the indicating part 1 in a countless variety of ways in accordance with the degree of mental and physical disability of the patient. Numerous arrangements are hereinafter described.

Figure 2:
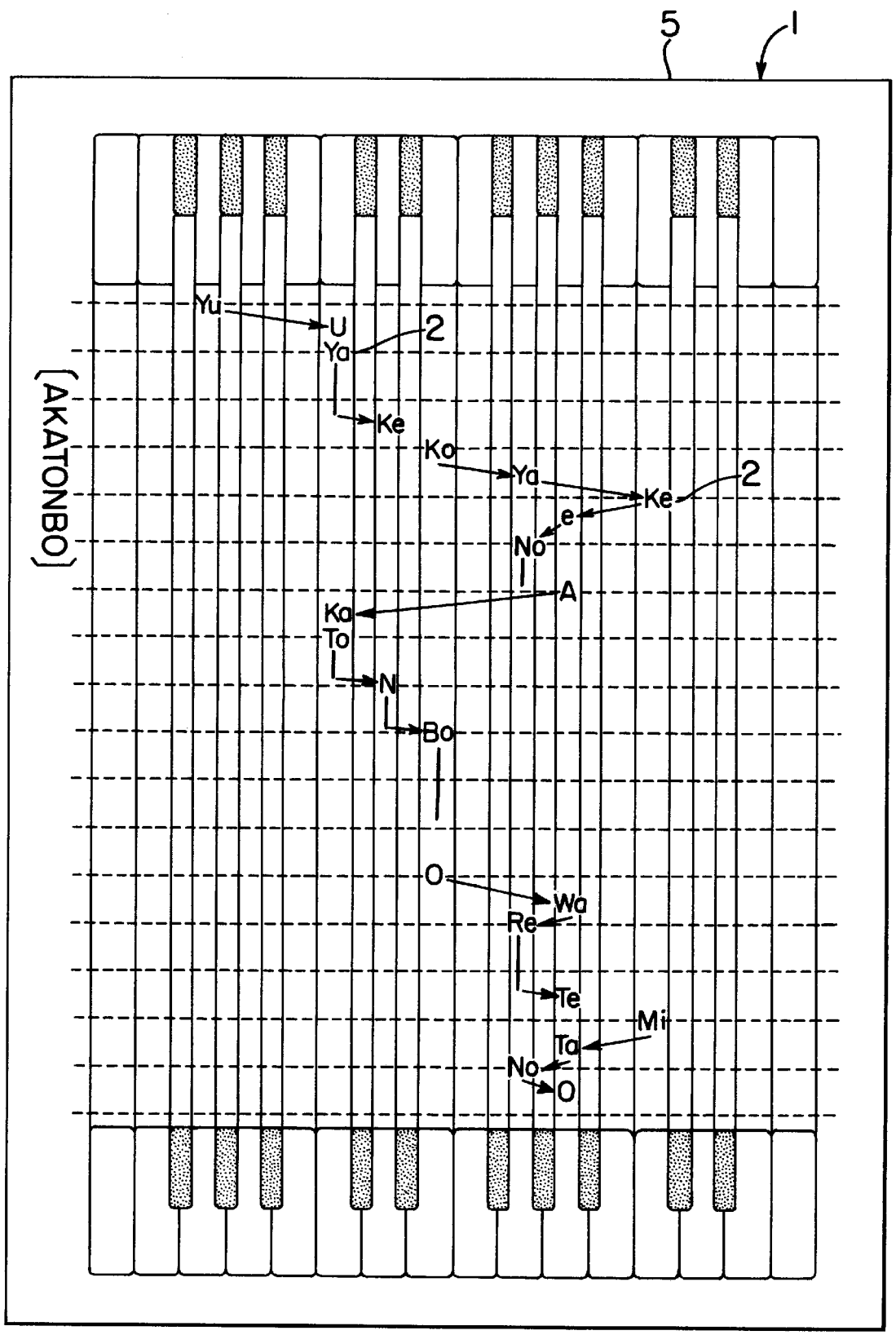
FIG. 2 is a plan view showing one embodiment of the indicating means of the musical instrument according to the present invention.

For example, for patients who are not severely mentally or physically disabled, the indicating part 1 may be imprinted with the external design and arrangement of a conventional musical instrument, such as the keyboard of a piano, in the upper and lower portions thereof, as well as a series of horizontal lines to illustrate the process of time, such as a musical time pattern and rhythm as shown in FIG. 2. Such a "dual keyboard" layout of the indicating part 1 is effective for use of the device in conjunction by an instructor and student for the purpose of teaching basic musical and verbal skills, and is effective to enable users to sing a displayed song because the natural division of the lyrics of the song and melodic lines are clearly depicted by the indicating part 1.

However, because it becomes increasingly difficult for patients to process complicated graphical information as the degree of mental and physical disorder progresses, it is desirable to provide the least indication necessary to meet the purpose, and to require the least possible amount of movement and manual dexterity to operate the instrument.

Figure 3:
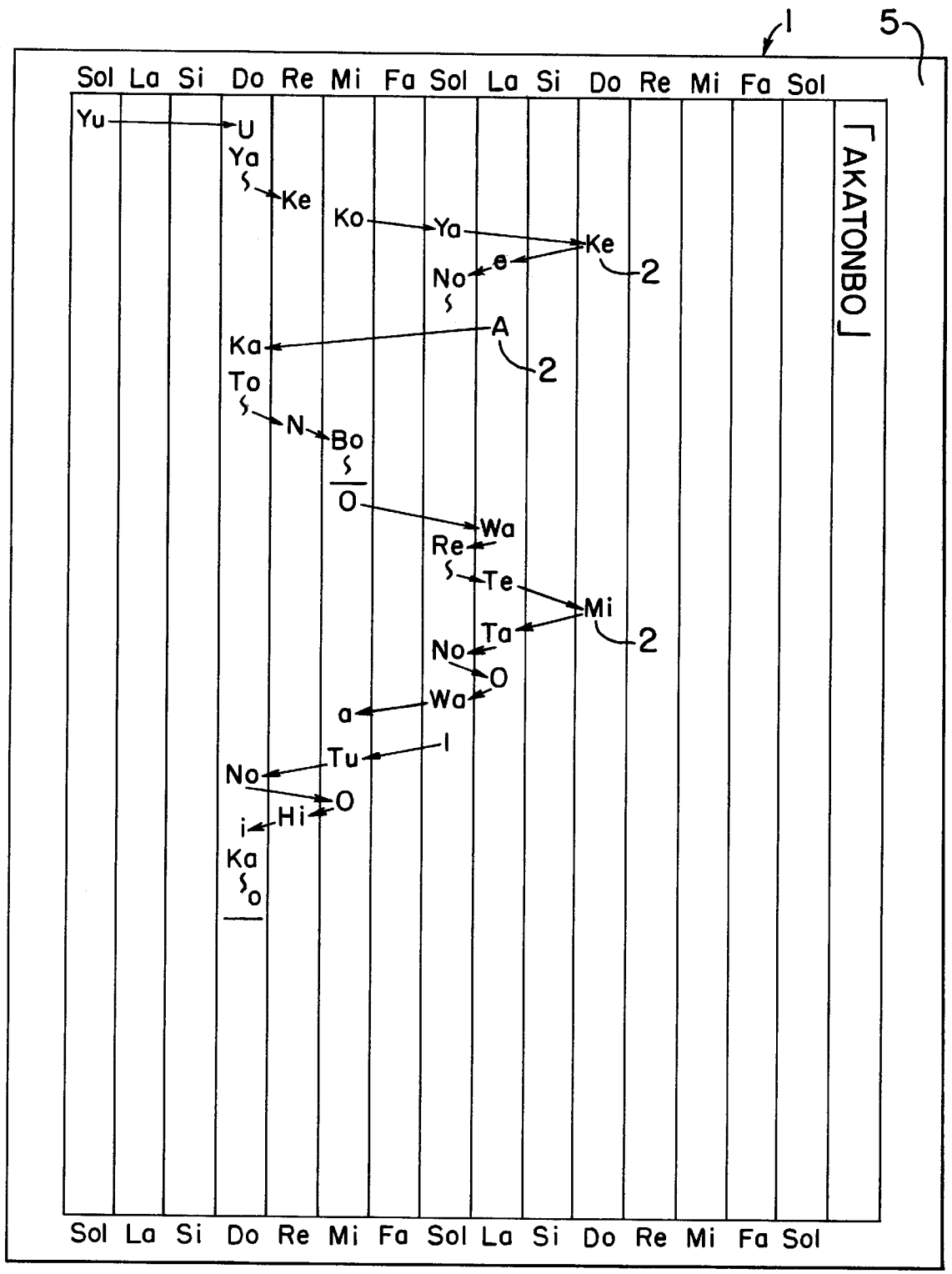
FIG. 3 is a plan view showing another embodiment of the indicating means of the musical instrument according to the present invention.

For example, when the degree of disorder is serious, conventional musical indicia, such as the depiction of a musical instrument and the illustration of a score, serve no useful advantage since patients suffering from profound functional brain disorders generally lack the cognitive ability to comprehend such illustration and will likely be confused by the complex graphical display. Similarly, in many such cases, the patient will lack the manual dexterity needed to manipulate a keyboard. Thus, in more serious cases, visual depictions such as those illustrated in FIG. 2 are not desirable for use in musical therapy. Accordingly, in such cases, the dotted horizontal score lines shown in FIG. 2 can be omitted as a visual feature, as can the depiction of a conventional musical instrument. Instead, data indicative of the progress of time, such as musical time pattern and rhythm of a song familiar to patients, can be stored in memory for patients suffering from a serious degree of disorder, thus simplifying the musical indication, as shown in FIG. 3.

Figure 4:
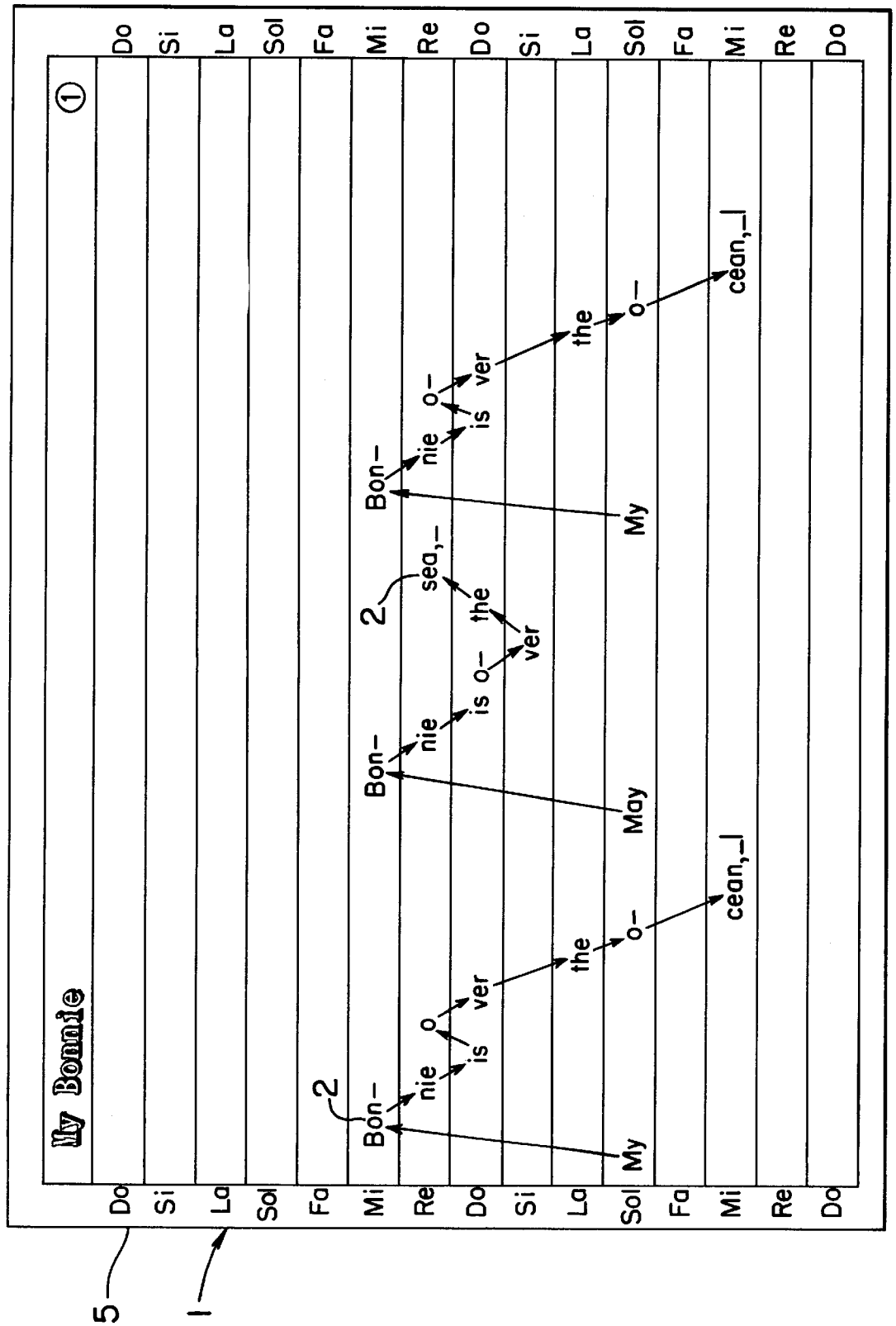
FIG. 4 is a plan view showing another embodiment of the indicating means of the musical instrument according to the present invention.

The indication of musical notes such a s "do, re, me, fa . . ." corresponding to a melody can also be omitted from the musical indicia 2, although such indicia is generally useful to a therapist. In addition, it is possible to display the musical indicia 2 in a horizontal rather than vertical manner in any language, such as English, German, French, etc., as shown in FIG. 4.

The front side of the operating panel 3 has approximately the same size as the indicating part 1. It is possible to use various types of switches which can be manually operated by the user, such as contact type switches, touch sensitive switches, photoelectric switches, or any combination thereof, for the plural switch elements. For example, the switch elements of the operating panel 3 shown in the upper and middle portions of FIG. 1 each comprise strip-shaped contact switches 7 which may be activated when depressed by the user at any position along the length of a respective switch 7. This type of switch element is highly advantageous for patients having profound disorders or limited manual dexterity. Such construction is also advantageous for use in the treatment of patients who have lost the use of their hands and must operate the device using a different portion of their body or a mouth stick 20, as shown in the upper portion of FIG. 1.

Figure 5A:
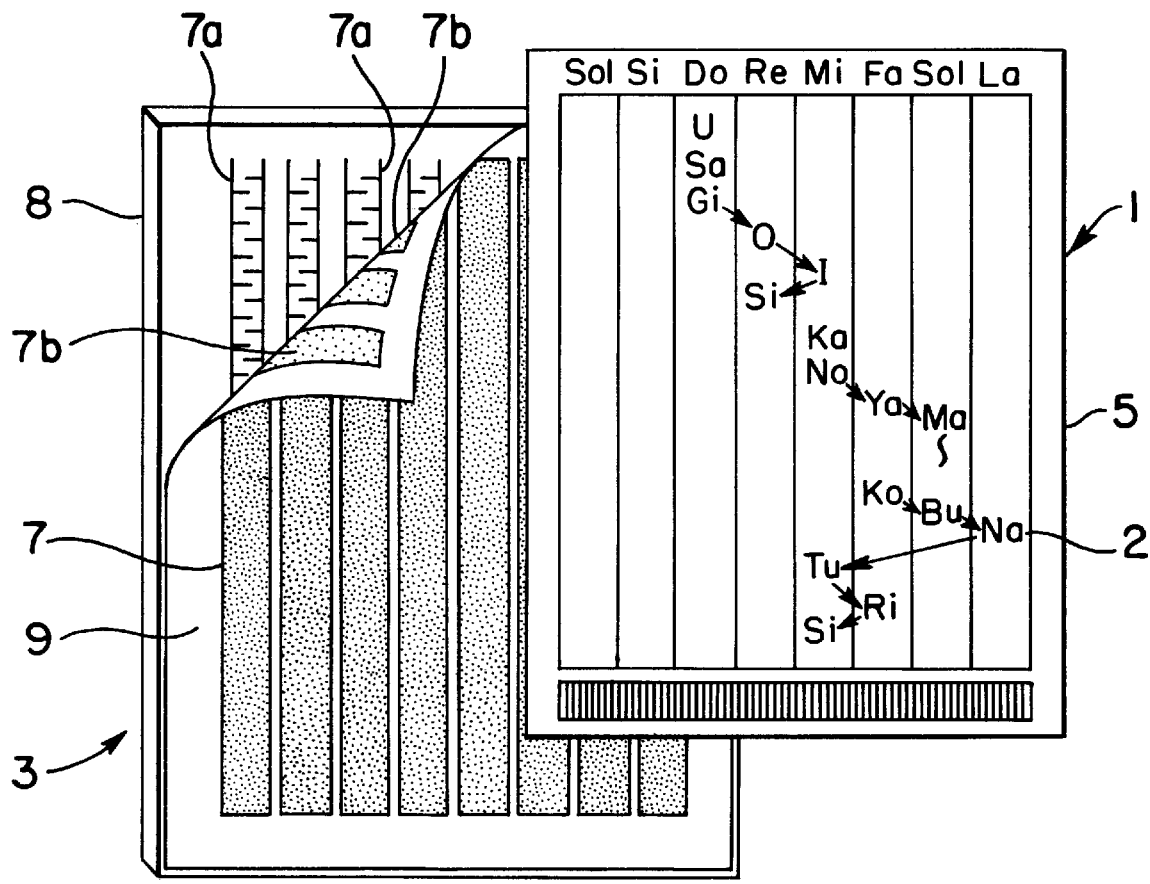
FIG. 5(A) is a perspective view illustrating one embodiment of the operating panel of the musical instrument according to the present invention, in which part of the surface sheet of the operating panel has been peeled back to reveal the lattice-type construction of the respective switch elements.
Figure 5B:
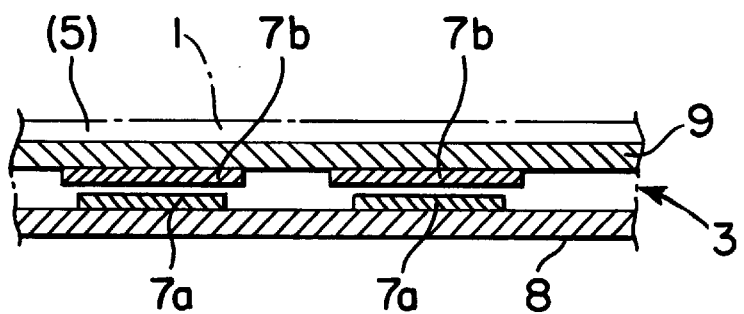
FIG. 5(B) is a sectional view of the operating panel of the musical instrument shown in FIG. 5(A) revealing the structure of the individual switch elements.
Figure 6:
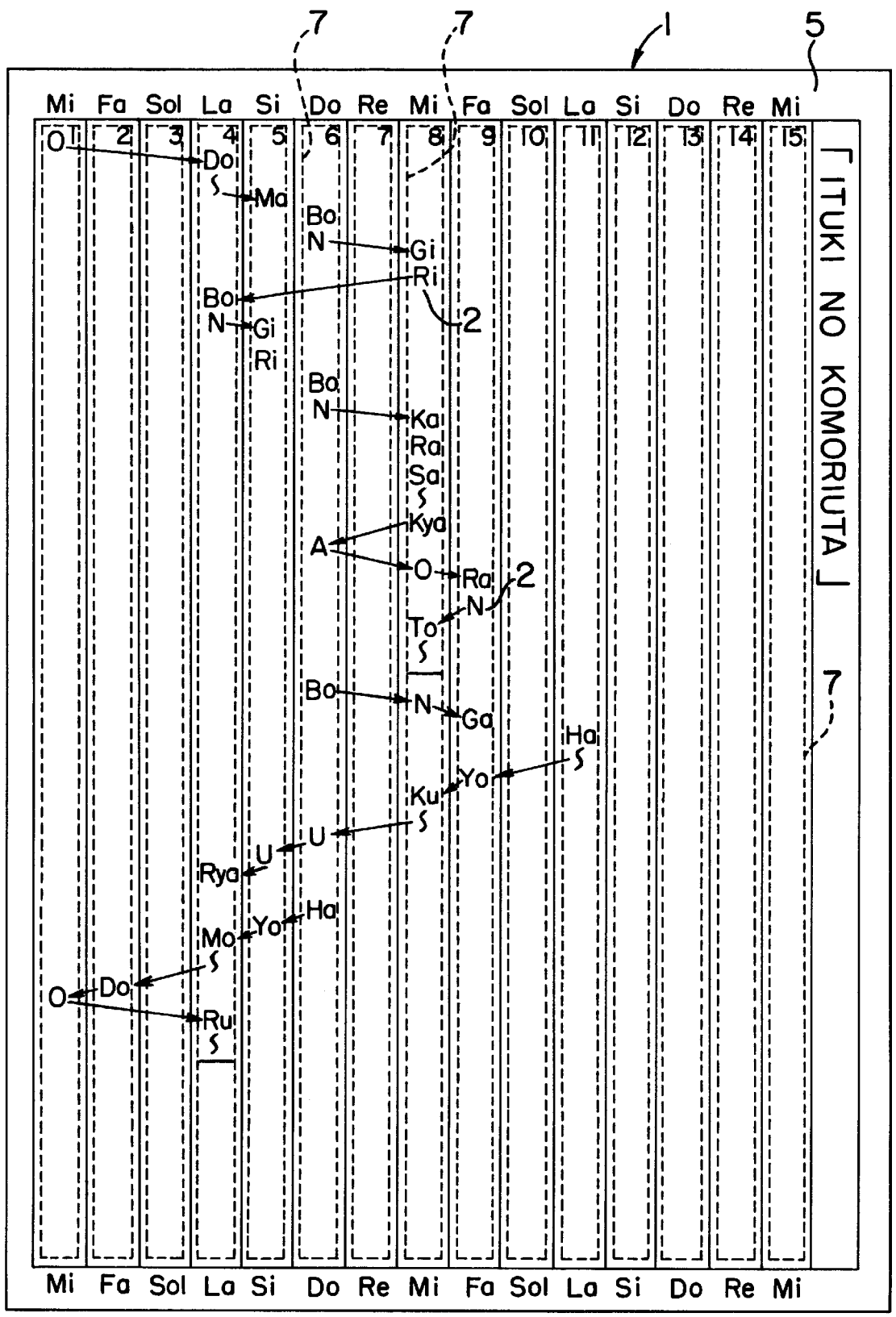
FIG. 6 is a plan view showing the musical instrument in one embodiment when the indicating means is mounted upon the operating panel.

One embodiment of a contact-type switch 7 is illustrated in FIGS. 5(A) and 5(B). In this embodiment, the operating panel 3 is provided with a base plate 8 on which are provided a plurality of lattice-shaped contacts 7a each arranged in the shape of an elongated strip that constitutes one section of the switch 7. A surface sheet 9 is adhered to the surface of the base plate 8 with an interval formed therebetween by a suitable flexible spacer or spring (not shown). Another plurality of contacts 7b, formed of a conductive material such as carbon and conductive rubber, are provided at locations on the back of the surface sheet 9 in alignment with the contacts 7a. When the indicating part 1 such as the sheet-type indicating body 5 is mounted upon the surface sheet 9 as shown in FIG. 5(B), the switch elements 7 are arranged in a position shown by the dotted lines in FIG. 6 when viewed from the surface.

Figure 7:
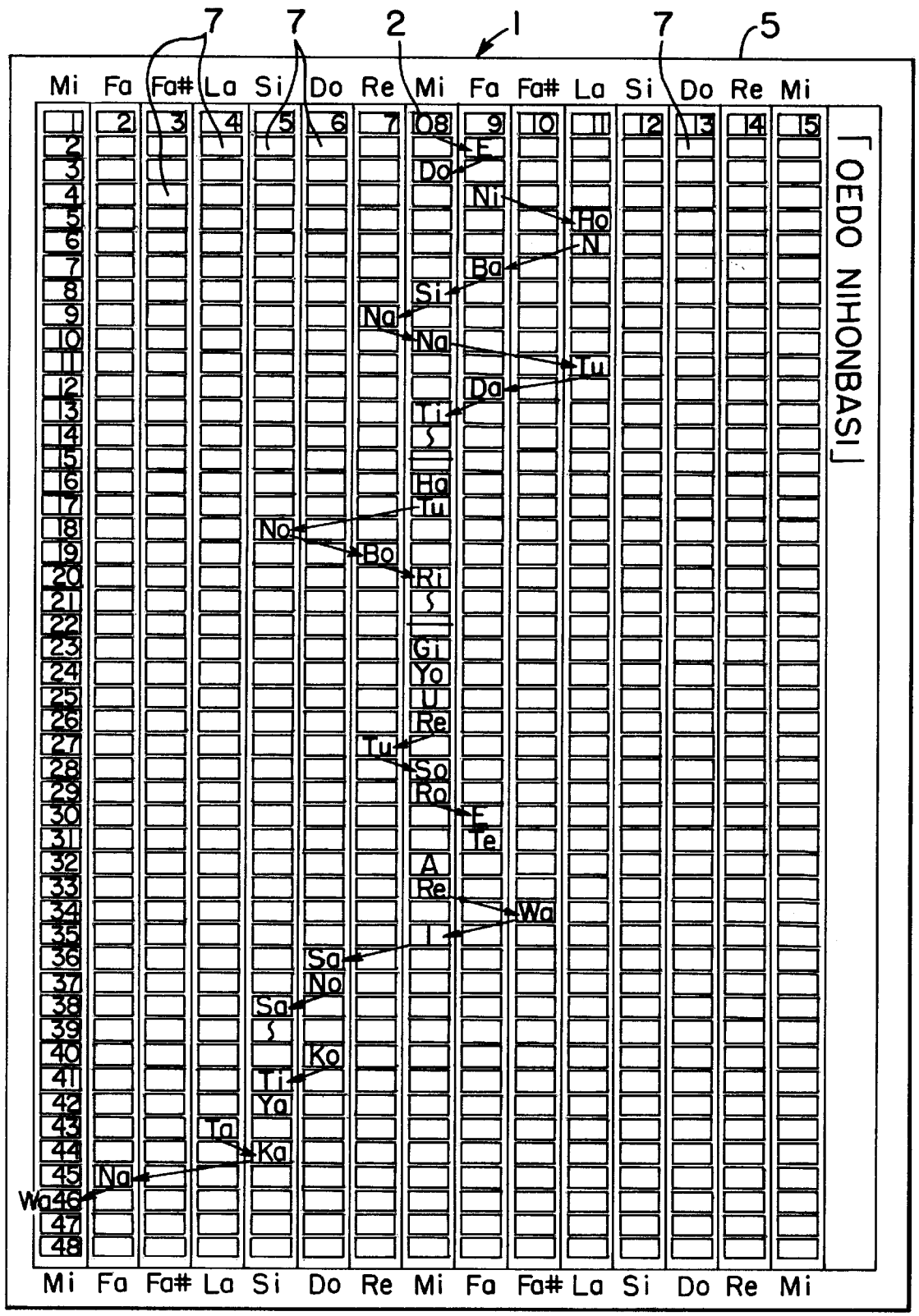
FIG. 7 is a plan view showing the musical instrument in one embodiment when the indicating means is mounted upon the operating panel.

Rather than being formed in elongated strips, the plural switch elements 7 can each be formed in a rectangular shape and can be arranged in a series of straight lines. When the indicating body 5 is mounted upon an operating panel 3 with plural switch elements of this type, the switch elements 7 are arranged in a position as shown by the rectangular frame in FIG. 7.

Figure 8A:
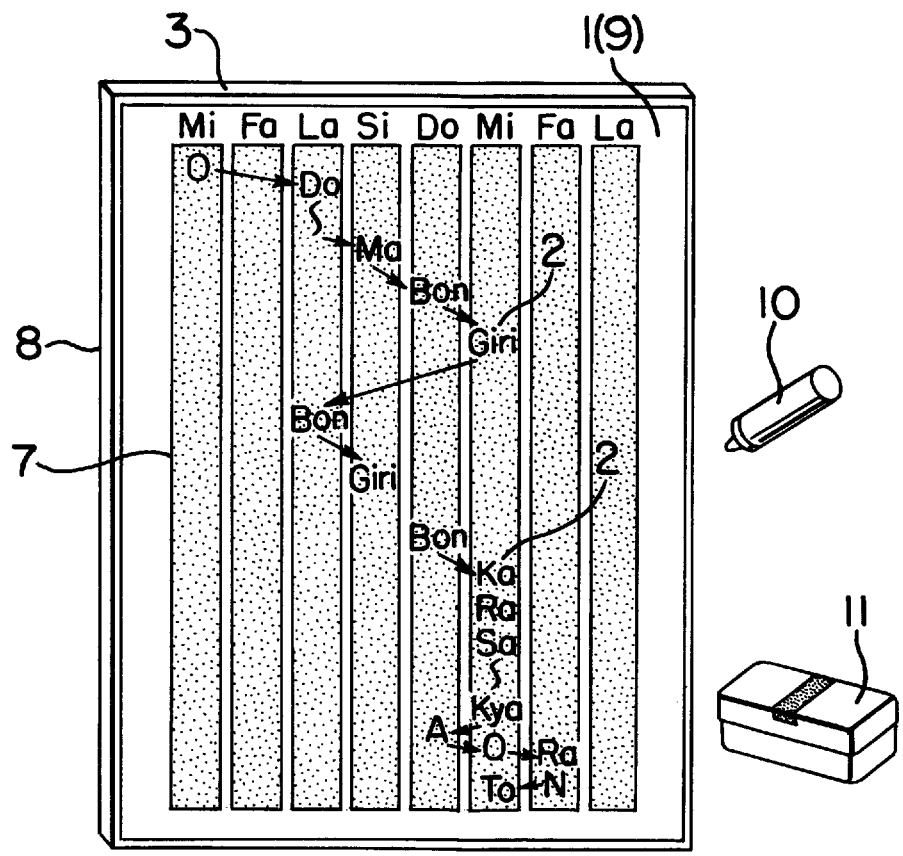
FIG. 8(A) is an explanatory view showing one embodiment of the musical instrument of the present invention in which the operating panel and indicating means are incorporated in a single assembly.
Figure 8B:
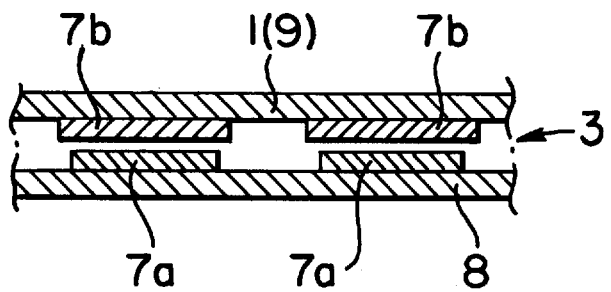
FIG. 8(B) is an expanded sectional view of the musical instrument of FIG. 8(A), illustrating the structure of the individual switch elements of the operating panel.

When the indicating part 1 is in the form of a sheet on which the lyrics of a selected song can be written with a writing utensil such as marker and erased when desired, it is advantageous to incorporate the indicating part 1 and the operating panel 3 in a single unit, as shown in the central portion of FIG. 1. An example of such embodiment using a plurality of contact type switch elements 7 is shown in FIGS. 8(A) and 8(B). In this embodiment, the construction of the switch elements 7 of the operating panel 3 is similar to the construction of the switch elements shown in FIGS. 5(A) and 5(B), however, the surface sheet 9 serves as the indicating part 1 and is formed of a flat dry erasable material so that the lyrics of song or other musical indicia can be written using a writing instrument 10 such as a felt-tip marker and may be erased with the eraser 11 as described above. This is a convenient arrangement because there is no need to provide the indicating body and operating part separately.

Similarly, when an electric display indicator 6 is used as the indicating part 1, as shown in the lower portion of FIG. 1, the operating panel 3 and the display 6 may be provided as a single integrated unit so that the operating panel 3 is formed on the screen of the indicator 6 using a photoelectric switch, touch sensitive switch, or the like, many of which devices are known to be activated using an indicating pen 12 or the user's fingertip. Also in this case, the switch elements may each be formed in the shape of an elongated strip or a series of aligned rectangles in the manner described above.

The scale generator 4 is provided to output a tone and/or voice signal to a speaker (SP) 21 when a respective switch element 7 is activated. Although the scale generator 4 is illustrated separately in FIG. 1, it may also be incorporated within the operating panel 3 or display type indicator 6.

The scale generator 4 of the present invention is a conventional music synthesizing device connected to the plurality of switch elements to produce a tone signal output corresponding to a selected switch element. As will be appreciated by those of ordinary skill in the art, the scale generator of a conventional electronic music synthesizing device may be used as the scale generator 4.

It is desirable to adjust the scale of the indicating part 1 to a particular major key to enable a patient to most easily sing a song in his or her natural voice. The melody of tonal signals generated by the scale generator 4 can be output in C major, D major, E major, etc., by use of a key controller 13. As will be appreciated by those of ordinary skill in the art, the key controller 13 is provided to change the major key while maintaining a constant musical pitch for the desired song. This construction makes it possible to play a melody in any major key that enables a person requiring treatment to sing a song easily without changing the scale of the indicating part 1. Moreover, as many songs have various scale changes including various major and minor keys, or, for example, the positive scale and negative scale of Japanese music or the scales and modulation of other folk music, it is advisable to control the scale generator 4 using the scale controller 14 to provide data concerning the type of rhythm associated with a particular song (i.e., average rhythm, genuine rhythm, etc.) and scales for the desired song. Such data can be obtained, for example, from a floppy disk (FD) 16, memory (ROM) 17 or code data 15 stored on the indicating body 5.

Figure 9:
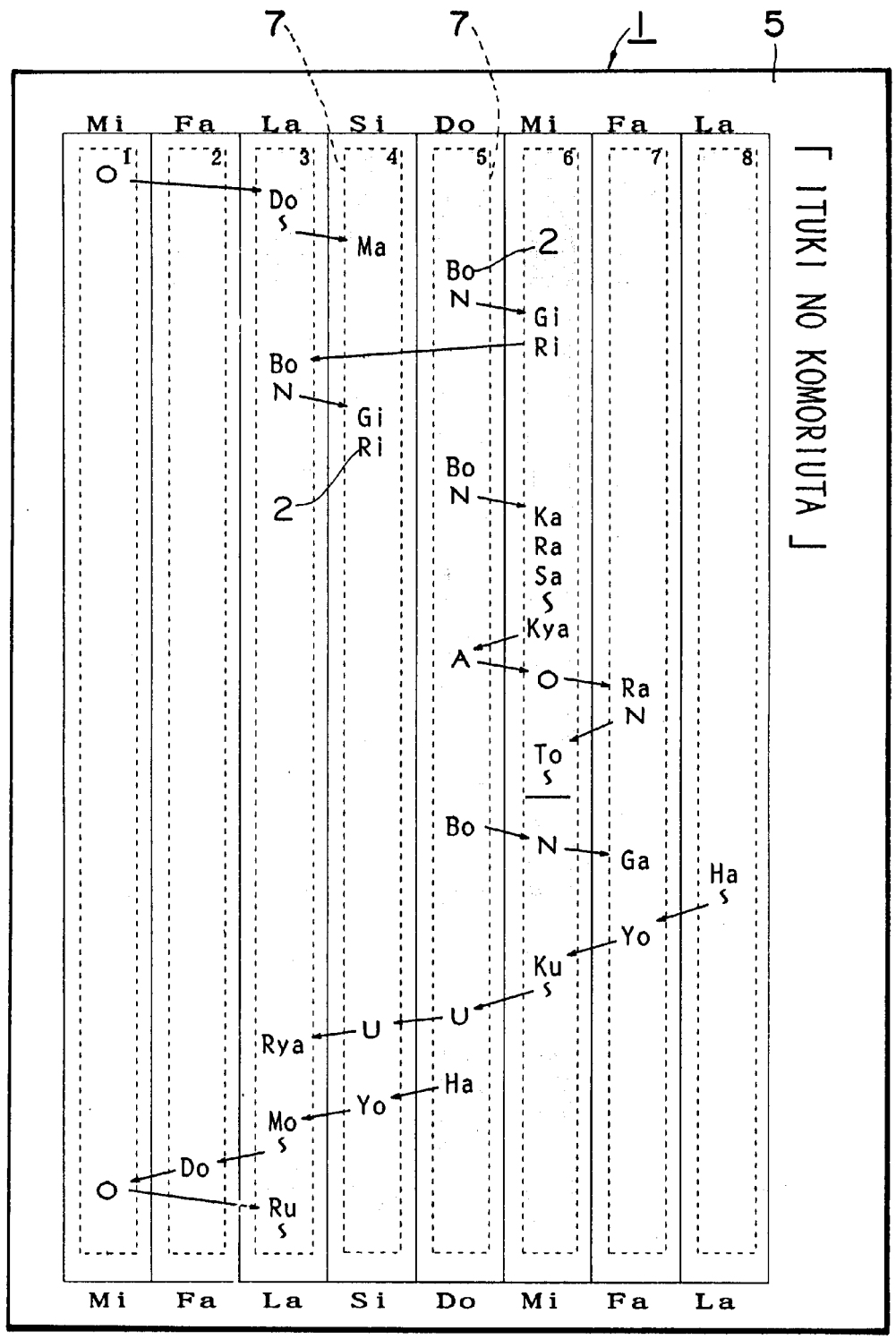
FIG. 9 is a plan view showing the musical instrument in an embodiment in which an indicating part having only the scale needed for playing a selected song is mounted upon the operating panel.

As shown in FIGS. 2 to 4, 6, and 7, not all of the scale indications provided on the operating panel 3 are used with every song displayed on the indicating part 1. Since many patients undergoing musical therapy have limited manual dexterity, it is desirable to allow selective assignment of the tone signals produced by activation of the respective switch elements for different songs. Such assignment is preferably effected to omit any unnecessary scales as shown in FIG. 9. In this case, the code data 15, such as a bar-code, and the corresponding musical information on the rhythm and melody of the desired song, is stored in a memory unit such as the floppy disk (FD) 16 or memory (ROM) 17 so that the assignment of the respective switch elements 7, i.e., the relationship between the respective switch elements 7 and the scale generator 4, can be controlled by the scale controller 14. In such operation, the code reader 18 reads the code data 15 provided on the indicating body 5 and/or the floppy disk (FD) 16 or memory (ROM) 17 in advance, and the scale controller 14 controls the scale generator 4. This measure proves to be effective in patients suffering from serious disorders.

Figure 10:
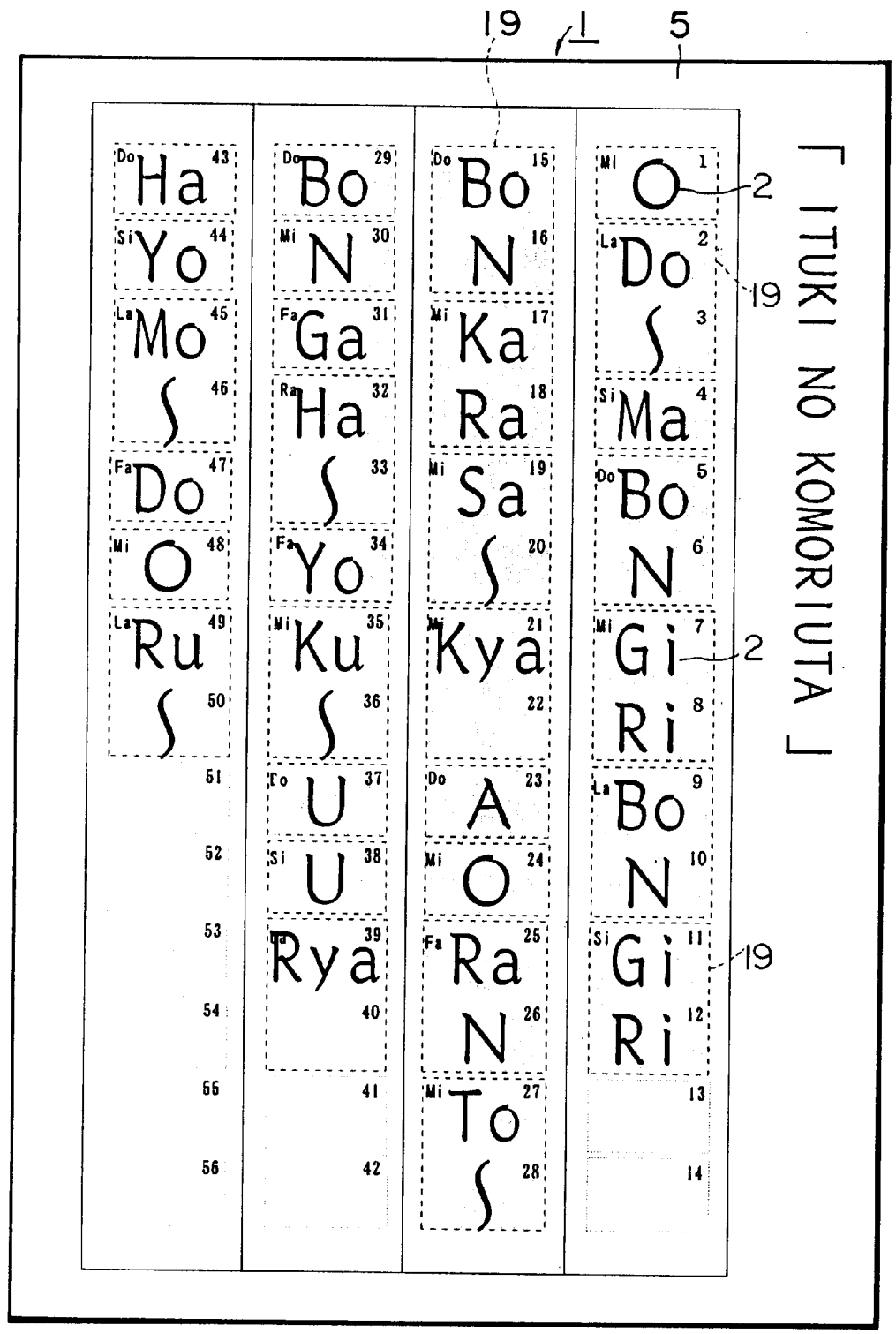
FIG. 10 is a plan view illustrating another embodiment of the musical instrument in which an indicating part having only the scale required for playing a particular song is mounted upon the operating panel.

Moreover, by controlling the relationship between the respective switch elements 7 and the scale generator 4 using the scale controller 14 in the manner described above, it is also possible to alter the relationship between the musical indicia 2 and the switch elements of the operating panel 3 in various respects. FIG. 10 shows an example of such an embodiment. As illustrated, the lyrics of a song 2 are imprinted on the indicating part 1 successively such that the song may be played by the user by successive operation of the switch elements 7. In this embodiment, a plurality of rectangular switch elements 7 for the same successive sound are grouped into one unit 19. By controlling the musical scale for each unit, it is possible to output the song from the scale generator 4.

A person requiring treatment can generate a melody corresponding to the lyrics of a displayed song with sound and/or voice controlled using the scale generator 4, by pressing or touching the control panel 3 at a region corresponding to the respective words of the song 2 displayed by the indicating part 1. The above-described structure is advantageous since it enables the patient to control the operating panel 3 using his or her finger or toe, or other part of the body, such as by use of a mouth stick 20 or the CRT indicating pen 12 to operate the respective switch elements.

The musical therapy instrument of the present invention is constructed in the above-described manner to generate a melody corresponding to the words of a selected song familiar to a patient undergoing treatment. The patient is able to play the song by depressing in a sequential manner respective switch elements disposed in physical alignment with the lyrics of a song or other musical indicia 2 displayed on an indicating part 1. This may be accomplished, for example, by arranging the lyrics of the song in a predetermined pattern to permit the user to play the song by merely swiping the indicating part 1 in the predetermined pattern. Accordingly, the knowledge and skill required to play a conventional musical instrument are unnecessary, and the instrument may thus be used by small children to promote the development of basic verbal, musical and mechanical skills. In addition, using the inventive musical instrument, patients suffering from severe disorders such as dementia, aphasia, and other functional disorders of the brain are capable of voluntarily playing and singing a desired song with or without direct supervision by a therapist. Thus, the beneficial effects of musical therapy in reconstructing the functions of brain can be achieved.

We claim:

1. A musical instrument comprising: indicating means comprising a flat sheet imprinted with the lyrics of a song arranged in a predetermined pattern; an operating panel having means for mounting thereon the indicating means and having a plurality of switch elements in physical alignment with the lyrics of the song displayed by the indicating means, each switch element having a pair of contact members mounted in the operating panel to undergo closure in response to physical pressure exerted upon a corresponding lyric of the song; and a scale generator connected to the plurality of switch elements for outputting a musical tone signal having a pitch corresponding to a selected switch element such that the sequential activation of switch elements corresponding to the lyrics of the song results in the output of a series of musical tone signals corresponding to the melody of the song by the scale generator.

2. A musical instrument according to claim 1; wherein the indicating means comprises a plurality of sheets of flat material each imprinted with the lyrics of a selected song.

3. A musical instrument according to claim 1; wherein the plurality of switch elements each comprises a contact type switch having an elongated contact member such that the switch element may be activated by physical contact at any location along the contact member.

4. A musical instrument according to claim 1; further comprising a key controller for controlling the scale generator to output a tone signal in a predetermined key.

5. A musical instrument according to claim 1; wherein the indicating means is provided with code data representative of a song displayed thereby.

6. A musical instrument according to claim 1; wherein the indicating means comprises a sheet formed of a flat material which may be imprinted with the musical indicia and which may be erased.

7. A musical instrument according to claim 1; wherein the scale generator outputs a musical tone signal comprised of a voice synthesized signal corresponding to the selected indicia.

8. A musical instrument comprising: indicating means for displaying the lyrics of a song arranged in a predetermined pattern; an operating panel having means for mounting thereon the indicating means and having a plurality of switch elements in physical alignment with the lyrics displayed by the indicating means; and a scale generator connected to the plurality of switch elements for outputting a musical tone signal having a pitch corresponding to a selected switch element such that the sequential activation of switch elements corresponding to the lyrics of the song results in the output of a series of musical tone signals corresponding to the melody of the song by the scale generator.

9. A musical instrument according to claim 8; wherein the scale generator outputs a musical tone signal comprised of a voice synthesized signal corresponding to the selected lyric.

10. A musical instrument according to claim 8; wherein each switch element has a pair of contact members mounted in the operating panel to undergo closure in response to physical pressure exerted upon a corresponding lyric.

11. A musical instrument according to claim 8; wherein the indicating means comprises a sheet of flat material imprinted with the lyrics of a selected song.

12. A musical instrument according to claim 8; wherein the indicating means comprises a plurality of sheets of flat material each imprinted with the lyrics of a selected song.

13. A musical instrument according to claim 8; wherein the indicating means comprises an electric display means for displaying the lyrics of a selected song.

14. A musical instrument according to claim 8; wherein the plurality of switch elements each comprises a contact type switch having a pair of elongated contact members mounted in the operating panel such that the switch element may be activated by physical contact at any location along a contact member.

15. A musical instrument according to claim 8; wherein the indicating means comprises an electric display means for displaying the lyrics of a selected song; and the switch elements each comprise one of a touch-sensitive switch element, a photoelectric switch element and a contact type switch element.

16. A musical instrument according to claim 8; further comprising a key controller for controlling the scale generator to output a tone signal in a predetermined key.

17. A musical instrument according to claim 8; wherein the indicating means is provided with code data representative of a song displayed thereby.

18. A musical instrument according to claim 8; wherein the indicating means comprises a sheet formed of a flat material which may be imprinted with the musical indicia and which may be erased.

\* \* \* \* \*